US007179514B2

(12) United States Patent
Olsen et al.

(10) Patent No.: US 7,179,514 B2
(45) Date of Patent: Feb. 20, 2007

(54) LAMINAR LABEL AS WELL AS A METHOD AND AN APPARATUS FOR PRODUCING THE SAME

(75) Inventors: Per Harald Olsen, Vinterbro (NO); Arnt Erik Haarstad, Spikkestad (NO)

(73) Assignee: Skanem Oslo AS, Lierskogen (NO)

( * ) Notice: Subject to any disclaimer, the term of this patent is extended or adjusted under 35 U.S.C. 154(b) by 0 days.

(21) Appl. No.: 10/380,601

(22) PCT Filed: Sep. 3, 2001

(86) PCT No.: PCT/SE01/01858
§ 371 (c)(1),
(2), (4) Date: Apr. 9, 2003

(87) PCT Pub. No.: WO02/22350

PCT Pub. Date: Mar. 21, 2002

(65) Prior Publication Data

US 2003/0175463 A1 Sep. 18, 2003

(30) Foreign Application Priority Data

Aug. 15, 2000 (SE) .................................... 0003271

(51) Int. Cl.
*B32B 9/00* (2006.01)
*B32B 37/00* (2006.01)

(52) U.S. Cl. ..................... 428/42.3; 156/253; 156/257; 156/264; 156/268; 156/277; 156/290; 156/387; 156/512; 156/517; 283/81; 283/105; 428/40.1; 428/42.1; 428/43; 428/138; 428/192

(58) Field of Classification Search ............... 428/40.1, 428/42.1, 43, 138, 192, 42.3; 156/253, 257, 156/264, 268, 277, 290, 387, 512, 517; 283/81, 283/105

See application file for complete search history.

(56) References Cited

U.S. PATENT DOCUMENTS 5,262,214 A * 11/1993 Instance .................... 428/42.1

(Continued)

FOREIGN PATENT DOCUMENTS

EP 0 506 202 A1 9/1992

(Continued)

*Primary Examiner*—Nasser Ahmad
(74) *Attorney, Agent, or Firm*—Davis & Bujold, P.L.L.C.

(57) ABSTRACT

A laminar label (7) which comprises a base label (4), which is attached to a release web (3) by means of a glue layer (5) on top of which base label a supplement (13) is applied, which is covered by a top label (11). The base label with a matching release web is made of the same starting material (40, 41) as the top label with a matching release web (9) and the base label and the top label are brought together on the release web (3) of the base label in a relative displaced position and with a special treatment, e.g., a removal of portions through punching of said starting material in order to form a base label and a top label, respectively. Also a method and an apparatus for providing laminar labels (7), base labels (4) being applied on a release web (3), supplements (13) being positioned on top of the base labels and top labels (11) being positioned in such a way that they overlap the supplements. A release web (40) with labels (41) is used for two different functions as a starting material for a release web (3) with base labels (4) and a release web (9) with top labels (11) and the base labels and the top labels are brought together on the release web (3) of the base labels in a relative displaced position and with a special treatment, e.g., a removal of portions by punching of said starting material in order to obtain base labels and top labels, respectively.

16 Claims, 5 Drawing Sheets

U.S. PATENT DOCUMENTS

| | | | | | |
|---|---|---|---|---|---|
| 5,263,743 | A | | 11/1993 | Jones | 283/81 |
| 5,439,721 | A | | 8/1995 | Pedroli et al. | 428/40 |
| 5,593,749 | A | * | 1/1997 | Instance | 428/40.1 |
| 5,639,332 | A | * | 6/1997 | Instance | 156/248 |
| 5,766,716 | A | | 6/1998 | Barry | 428/40.1 |
| 5,944,357 | A | * | 8/1999 | Instance | 283/101 |
| 6,120,637 | A | * | 9/2000 | Barry | 156/252 |

FOREIGN PATENT DOCUMENTS

| | | |
|---|---|---|
| EP | 0 594 560 A2 | 4/1994 |
| EP | 0 833 295 A1 | 4/1998 |
| WO | 00/13884 | 3/2000 |
| WO | 00/23970 | 4/2000 |

* cited by examiner

Fig. 11
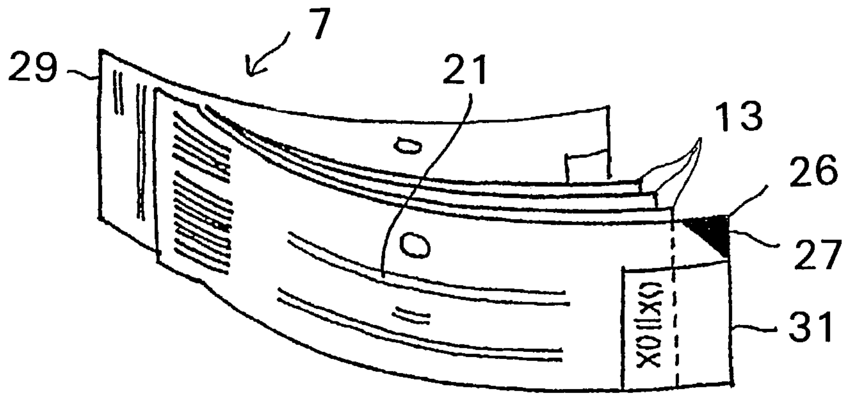
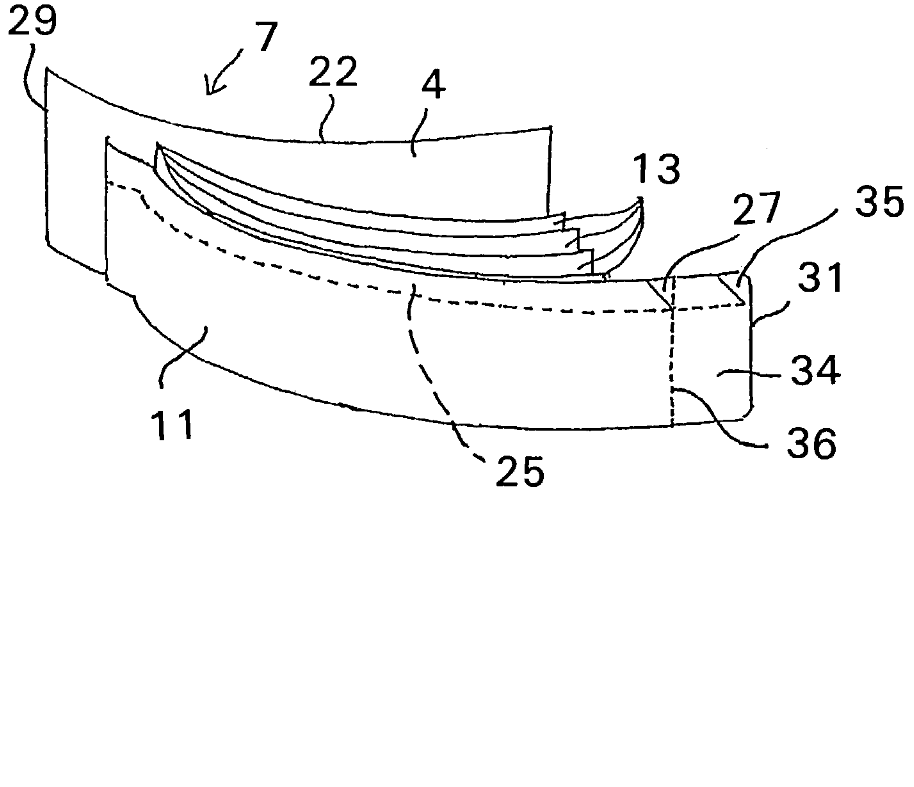
Fig. 12

LAMINAR LABEL AS WELL AS A METHOD AND AN APPARATUS FOR PRODUCING THE SAME

The present invention relates to a laminar label according to the preamble of claim 1. The invention also relates to an apparatus for producing a laminar label according to claim 1 according to the preamble of the first apparatus claim. The invention also relates to a method of producing a laminar label according to claim 1 according to the preamble of the first method claim.

BACKGROUND OF THE INVENTION

Such labels include a base label portion to be fastened to a container or the like, a supplement portion, e.g., a folder, as well as a top label portion to be fastened to the base label portion and/or to the container or the like, including the supplement portion. The labels are also called laminar or folder labels.

The invention relates specifically, but not exclusively, to labels for the pharmaceutical industry and similar lines of business in which a defective production of labels might have disastrous effects.

Many requirements are attached to the production and the use of laminar labels for the pharmaceutical industry. For instance, the upper side of a laminar label, applied to a container, must appear as a medicament signature according to regulations. Also additional information about the product or instructions for its use must be included here. The signature on the base label must at least adequately agree with the signature on the top label portion, because the product itself must be marked, according to regulations, if the supplement with the top signature and the top label portion is removed. Also, it is important that the serial and shelf-life data information, applied by the pharmaceutical manufacturer, remains on the base label portion and also on the product. This is an important traceability documentation.

Several different printing processes, methods and operations for the application of critical text result in an increased risk-taking. On the majority of laminar labels, the text in the top label signature and the base label signature today is printed in different printing operations and with different printing methods. This results in increased risks of mistakes.

Medicament labels often have 2–4 colors, which are used in order to emphasize critical information. The base label with its signature text is printed separately. The signature text in the top label portion of the laminar label is printed jointly with the information text in the label supplement. In order to make the signature in the top label portion and the base label portion alike the label supplement must have the same number of colors as the base label portion. Owing to this the risks as well as the costs will increase.

One of the most common laminar label solutions is to use a clear, thin and close-fitted, self-adhesive, top label portion in order to enhance the quality as well as to render possible a practical opening and (re)closing. The laminate is often treated on its glue side by the label manufacturer in order to facilitate the opening/closing of the label.

The pharmaceutical industry also prints production data and serial information on the laminar label, which are critical traceability data. On completely laminated laminar labels, these data are printed on the laminate. In case the supplement with the laminate disappears from the container, the remaining basic signature will contain traceability data since they accompany the laminate.

Another element of risk consists of the possibility that the wrong supplement and base label may be brought together. As the majority of laminar labels are produced today, this may involve risks that the base label signature does not correspond to the top label signature and also that the user information is wrong.

There are several known and patented solutions for laminar labels and production processes for them. Most of these solutions consist of three components, produced in three separate processes. This can result in increased risks of faulty production and lower application quality for the finished product, particularly in the following respects: printing variability which results in color variations and the risk of wrong text and wrong assembly of label components. Lower product quality in the form of stiffer labels when paper and glue are used to attach supplements to the base label portion. A glue gets hard and brittle, the label becoming less accommodating. This is particularly important when cylindrical containers are to be labeled.

It is difficult to attach a thick traditional laminar label around a cylinder with a relatively small diameter. When the laminar label has been attached a cylinder, the cylinder diameter of the base label portion will be less than the cylinder diameter of the outer portion of the supplement, the ends of which striving to loose the ends of the base label portion. In order to counteract such an effect, laminar labels have been developed having a base label, a supplement and a top laminate. When cylinders are labeled, the end of the top laminate, which is turned away from the application end, is extended compared to the base label and the supplement. This extension contacts the release paper web and is released from it in the application phase, and the laminate yields to the curvature of the cylinder and is attached without wrinkles on the cylinder surface by means of the glue on the rear face of the laminate.

One example of the state of the art is described in EP 0 833 295 B1, which includes a printed base label portion and a printed brochure with a top signature. The entire label is covered by a laminate and the brochure is attached to the laminate, which fastens the brochure to the container against an extra applied base label portion. The label comprises four portions: a base label, a brochure, a fitted laminate and a separate, specially treated, extra base label portion designed to allow an easy opening/closing of the brochure.

Another example of the state of the art is EP 0 594 560 B1. In this case, the base label is provided with glue, which fastens the lower side of a folder to the base label. The folder and the signature are printed in the same operation. A stiff glue surface means that the label will be stiffer and less flexible. Paper is also stiffer than PP and PE. The self-adhesive base label is designed to support the folder, bind it to a product and make available place for printing of serial and production data. The entire label is covered by a thin, clear laminate in order to enhance the quality and fasten the folder label to the product. The laminate is perforated to allow traceability data on the base label to be visible, in case the folder disappears. A risk of losing the folder exists since perforations, in general, are not completely reliable. It is also necessary to print ink in fields on the glue side of the laminate in order to attain a sufficient gripping power. This label solution reduces the number of text sides with at least one side, since the top face of the label and the last folder side are to be glued to each other.

According to EP 0 506 202 B1, a base label is printed separately and is provided with glue and then a folder is glued to the side of the label. The entire label is then covered by a laminate, which is fastened to a product. The production and its advantages and drawbacks roughly correspond to those described in the preceding example.

SUMMARY OF THE INVENTION

The object of the present invention is primarily to eliminate the above mentioned drawbacks and to develop an improved laminar label, which is advantageous in several respects. Another object of the invention is to develop an improved production device and an improved production method for laminar labels. It is important that the supplement can be printed in the simplest possible way and separately from the signature of the label on the base portion and the top portion respectively. Also one object of the invention is to develop satisfactory gripping means, designed to open and close, respectively, the supplement, the label manufacturer not being required to perform complicated and expensive process operations.

These objects are attained by designing a label of the type described in the introduction substantially in such a way, as is set forth in the characterizing clause of claim 1. Said objects are attained also by means of an apparatus for the production of labels according to claim 1, mainly designed in the way set forth in the characterizing clause of the first apparatus claim. Said objects are attained also by means of a method of producing laminar labels according to claim 1, mainly carried out in the way set forth in the first method claim. Thanks to the characterizing features according to the invention it is guaranteed that the signature on the base label and on the top label are identical and have the same quality and are printed in the same product and under the same careful and reliable control, mistakes certainly being avoided and the critical importance of particularly central text portions and traceability information of the signature being taken into corresponding consideration. According to the invention, the solution is simple and reliable and enhances the opportunity to process control and after-control. The supplement can be printed in one color, even if the label itself and the signature, respectively, are printed in several colors. A production with one color is safer than a multicolor production and allows the use of several printing methods, e.g., from one roll to another in digital printing or laser printing and the like. These methods may enhance the safety. The laminar label comprises two identical labels, one base label and one top label. Both labels are produced and controlled in the same process and the same machine. The supplement is positioned between the labels. No additional cost-increasing projecting gripping ears on the supplement or storage and processing of the laminates are required. The opening of the label is facilitated, since the base material for the label has glue-free edges (strips), being designed to be accommodated below the opening corner of the top label. Also, there is no complete upper lamination which would require perforations in order to save serial and shelf-life data. The top label does not conceal this type of information. It is easy to remove the label and the supplement without damaging the base label. The supplement is fastened to and “clings to” the glue side of the top label. There is no gluing of the supplement to the base label, which would increase the stiffness of the laminar label. One or several reference-portions can be formed by the closing end of the top label or in connection with it. A removal can be done and is facilitated by means of perforations and a glue-free zone below the gripping corner. Serial and production data can be printed on the primary application end of the base label and on said reference-portions, which latter portions can be torn off and fastened to a case-book, a syringe and the like. When the label is applied to cylindrical objects, the reference-portion and portions, respectively, may overlap said primary base label end. When a clear, transparent label material is used, the entire label surface or portions of it may be covered with paint, e.g., when using a screen printing process, allowing the text and the graphic design of the top label and the first page of the supplement to be read in combination. This is important because the information required for the control of the correct supplement against the correct label must be visualized. During the handling of the materials, it is also advantageous to be able to start with one single continuous material web for the two types of label, after the punching and the bringing together of these types of labels, to be able to obtain a web, which is continuous in the transverse direction and the longitudinal direction and comprises complete laminar labels, including residual materials and, after additional punching of complete separate labels, be able to obtain one single continuous residual material-web.

BRIEF DESCRIPTION OF THE DRAWINGS

Additional characterizing features and advantages of the invention are set forth in the following description, reference being made to the accompanying drawings, which show preferred but not limiting embodiments:

FIGS. 11 and 12 show in perspective views from above and from the front respectively two different labels according to the invention, with and without respectively a reference-portion , opened up, in application phases on a round container (not shown).

DETAILED DESCRIPTION OF THE INVENTION

Figure 1:
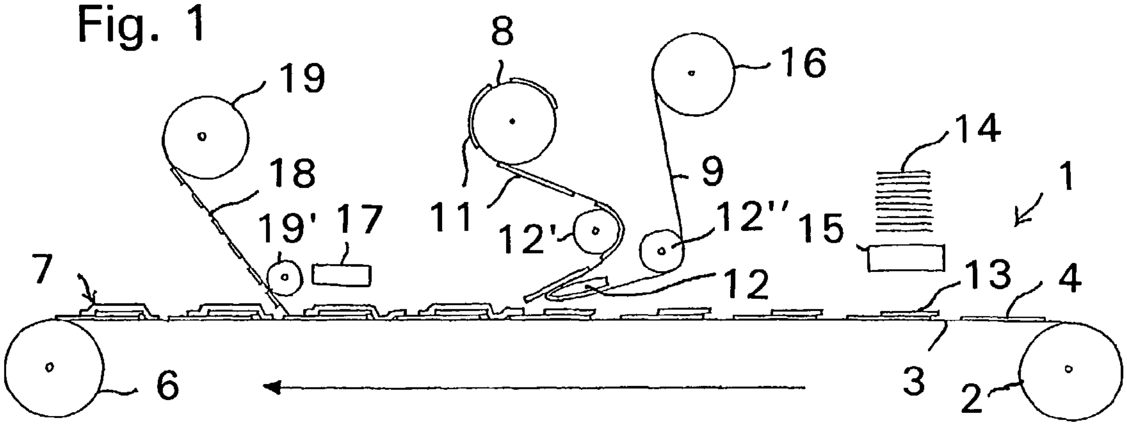
FIG. 1 shows in a lateral view the main features of a method of producing laminar labels according to the invention.

An apparatus, in its entirety designated 1, is shown in the drawings and is designed to produce laminar labels. The apparatus comprises a roll 2, known per se, having a through release web 3, e.g., made of silicone-treated paper, on which web base labels 4 are applied having a glue layer 5, which is active against this web, and which web leads to a roll 6 with finished labels 7 according to the invention. The apparatus also comprises a roll 8 with a through release web 9, on which top labels 11 are applied, having a glue layer 10, which is active against this web, and which web is fed, via a separation and application device 12, and e.g., a downstream guide roll or the like 12' and 12", respectively, against release web 3 in such a fashion, that top labels 11 are released from release web 9 and end up on top of base labels 4, supplements 13 being included, which before then have been fed towards base labels 4 from a supply 14 via a separation and application device 15, known per se. Glue layer 10 of top labels 11 is mainly active against the supplements, but it always adheres directly to the base labels and materials surrounding them, respectively, in the same label film web in front of and behind the supplements, seen in the direction of web 3 and possibly in the transverse direction of the web beyond the supplements. Preferably the top sheet or the like of the supplements is somewhat longer than the underlying sheets or the like and, consequently, the latter can normally never contact glue layer 10. Subsequently, the empty release web 9 is rolled up on a roll 16

Between device 12 and roll 6 with finished labels, there is a punching device 17, of a type known per se, designed to punch the finished labels. A continuous residue web 18 is then obtained, which is rolled up on a roll 19 via a guide roll 19'. Adjacent several labels or label rows, applied to web 3 in a transverse direction, there is, before roll 6, suitably a cutting device (not shown), which cuts web 3 between adjacent and mutually separated labels into partial webs, one for each label row and, consequently in such cases, there is as many rolls 6 (in the transverse direction of the web) as there are labels in said direction.

The base labels and the top labels are printed in the same printing process and preferably in the same printing device, a complete identity of above all their signatures 20 and 21, respectively, being guaranteed. The labels are inspected and made ready to be used in apparatus1. Normally signature 21 and the top labels and possibly other top label parts should end up straight above signature 20 of the base labels and possibly other corresponding base label parts separately. However, alternatively a certain relative displaced application of the top labels above and on top of the base labels can take place, e.g., in order to make certain parts of the base labels visible despite the supplements and despite the top labels, respectively, and to be able to read them at the same time or the like. Supplements 13 are printed separately in a printing device (not shown). Typically the supplements are pamphlets, folders and the like. However, a supplement can be a product of an arbitrary type which can be provided as such in a package or in another arbitrary fashion.

It is suitable to apply several, e.g., four, base labels, supplements and top labels in a transverse direction on the respective webs. Then and on the whole respectively parts of the outermost specimens of said three components in the transverse direction will project above the contemplated limiting edges in the transverse direction and be removed by punching by means of said punching device. Likewise, there may be, but not necessarily, sections which can be removed by punching, between labels, arranged adjacent each other in a transverse direction. In this way and because there also are continuous, punchable sections in a longitudinal direction of the web, said continuous rollable residual web 18 will be obtained. Section 23 of the supplement, which in a transverse direction projects above the outermost contemplated label edges 22, suitably is provided with a small glue point 24 on the side, which faces the base label, in order to temporarily fasten the supplement to the base label, since the base label and the supplement for the rest are not provided with any glue layers on their sides facing each other. Thus, this temporary fastening means serves a useful purpose between devices 12 and 15.

The base and the top labels suitably are made of a thin film of polypropene, which is clear as glass in its initial condition. The glue usually has carefully proportioned adhesive and release properties. However, glue layer 10 of the top label suitably does not cover the entire reverse side of the top label but preferably leaves a glue-free through strip 25, which extends in the longitudinal direction, suitably in connection with the upper edge of the label. Also, the base label has such a glue-free strip which, however, normally does not serve any useful purpose. Said upper edge area is in one of the corner areas 26 provided with an opening notch 27. Said corner area projects in the longitudinal direction of the web to a position substantially above the supplement, which also the top label section, positioned below this corner area, does, which suitably is made of a clear film and is a window 28, designed to show portions of the supplement and/or the base label. Thus, the corner area is not fastened to the base label , which is positioned directly below it in this area, and can in this way be easily lifted from it by initiating a separation of the two label portions within the area of the window, where the top label is fastened by means of said underlying glue layer to the base label. Also, the glue-free strip possibly can be used to initiate a release of the supplement from the top label. If this is required, at least the side of the supplement, which is exposed to the top label, should be made of materials having certain release properties.

Figure 2:
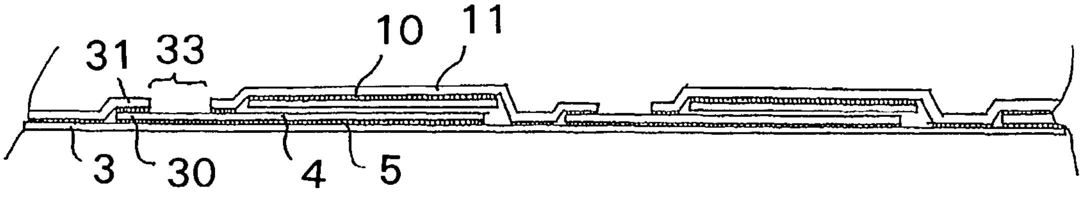
FIG. 2 shows in a lateral view an intermediate phase of the method according to FIG. 1 on a larger scale.
Figure 3:
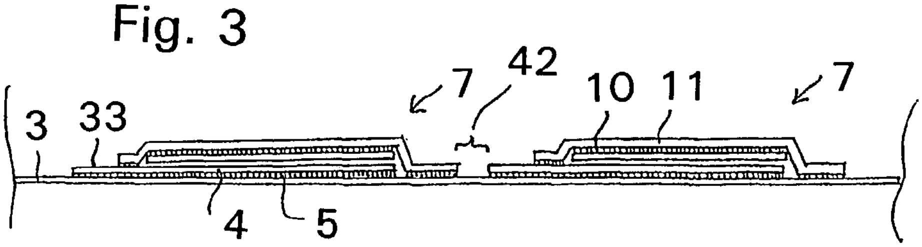
FIG. 3 shows in a lateral view a section from the final phase of the method according to FIG. 1 on a larger scale.
Figure 4:
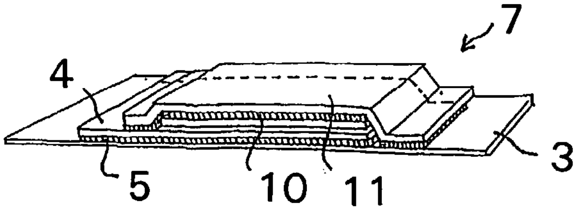
FIG. 4 shows in a perspective view from above a finished label according to the invention, which however still is attached to a release material-web.

It is shown in FIGS. 1 and 2, that one end 29 of the base label, usually the front end in the conveying direction of the web, is provided with an extended section 30, which is overlapped by an extended section 31 of top label end 32 within this area. These sections, fastened to each other, are designed to be punched and become a portion of residual web 18. In this way, a required distance 42 between the finished labels is obtained automatically in the longitudinal direction of the web. The remaining part of base label end 29, which consequently is free from the top label, forms a field 33, to which a text and the like can be applied.

Also, top label end 32 can be provided with one or several reference-portions 34 having their own opening notch 35 and having, e.g., a perforation line 36 as a tear-off-notch for end 31. Of course, glue-free strip 25 continues also below possible reference-portions.

Figure 5:
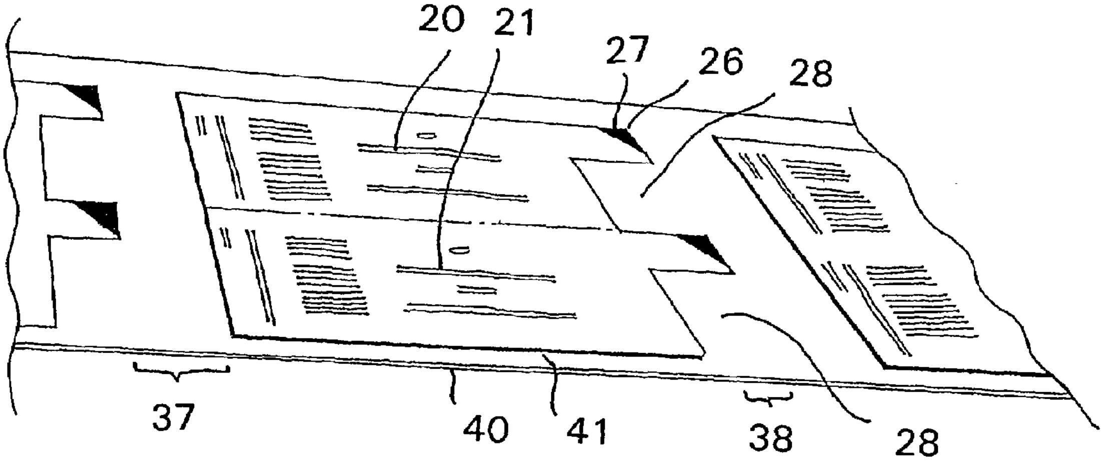
FIGS. 5–10 show in perspective views from above consecutive production phases and portions of labels according to the invention.

FIGS. 5–10 show more, in detail, how a preferred adjustment of the base labels and the top labels can be done, per se and in relation to each other. Thus, FIG. 5 shows the initial shape 41, which is common or designed for two different functions for two base and top label rows, which are arranged in a transverse direction on a release web 40 and, in this case, only exist in a printed embodiment. Web 41 is unitary in the longitudinal and in the transverse direction and is, in this phase, provided with all the printing, also the signatures and possibly additional text and symbols and possibly perforations or the like, which a label manufacture needs to apply. The width of web 41 preferably corresponds to the width of release web 40. Windows 28 remain as the clear initial film material, whereas the labels for the rest are, e.g., painted white and on top of this painted layer are provided with said printing. One type of ink with a certain color for the printing can, of course, be selected. The dash dotted line between the two labels in a transverse direction only indicates where a cutting and a punching, respectively, is to be done, with or without a longitudinal surplus strip.

Figure 6:
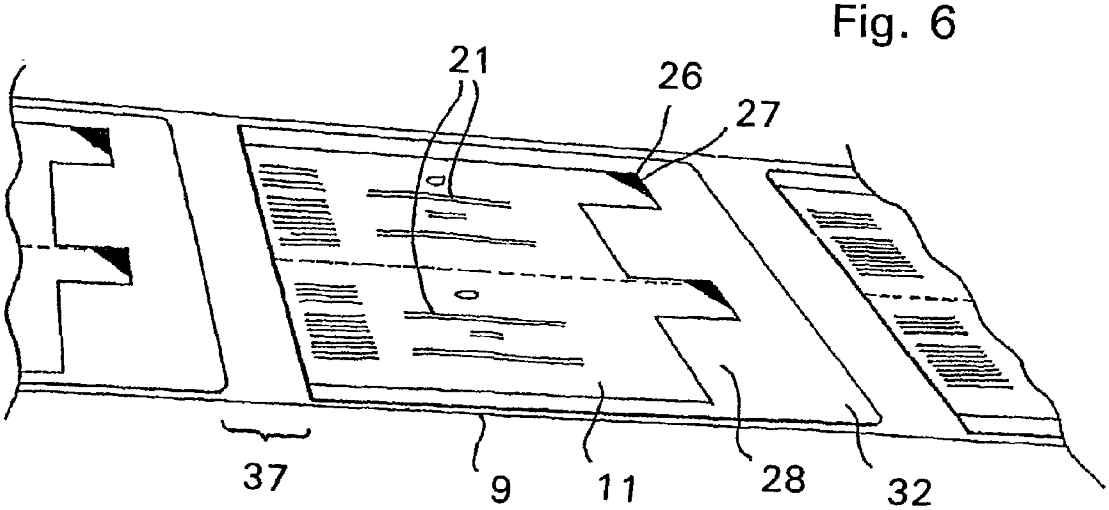
Figure 7:
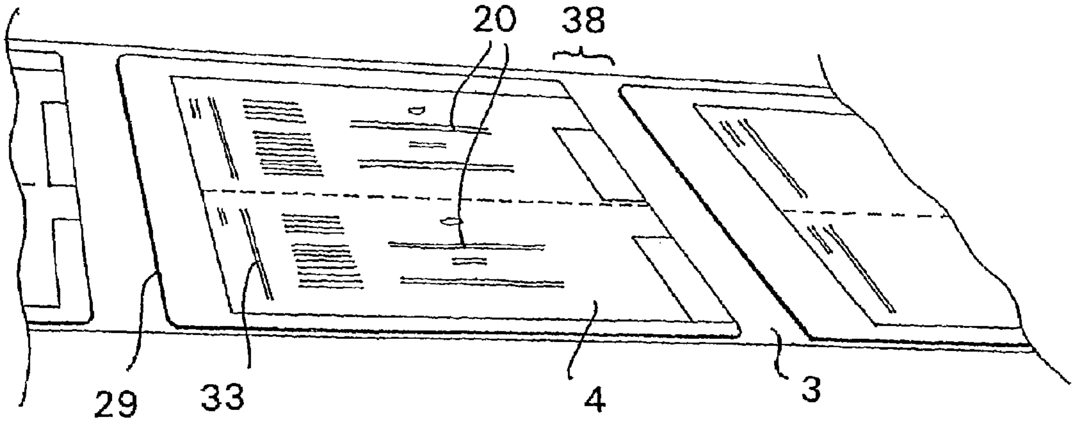
Figure 8:
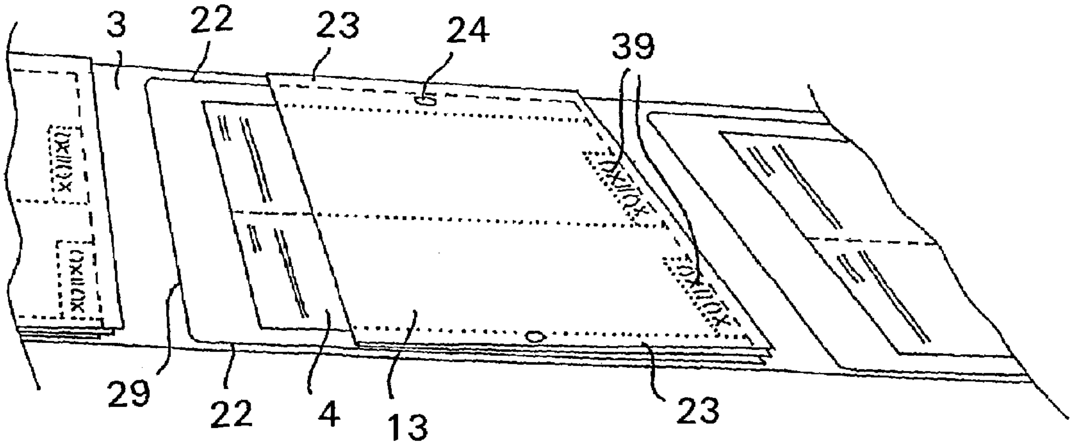
Figure 9:
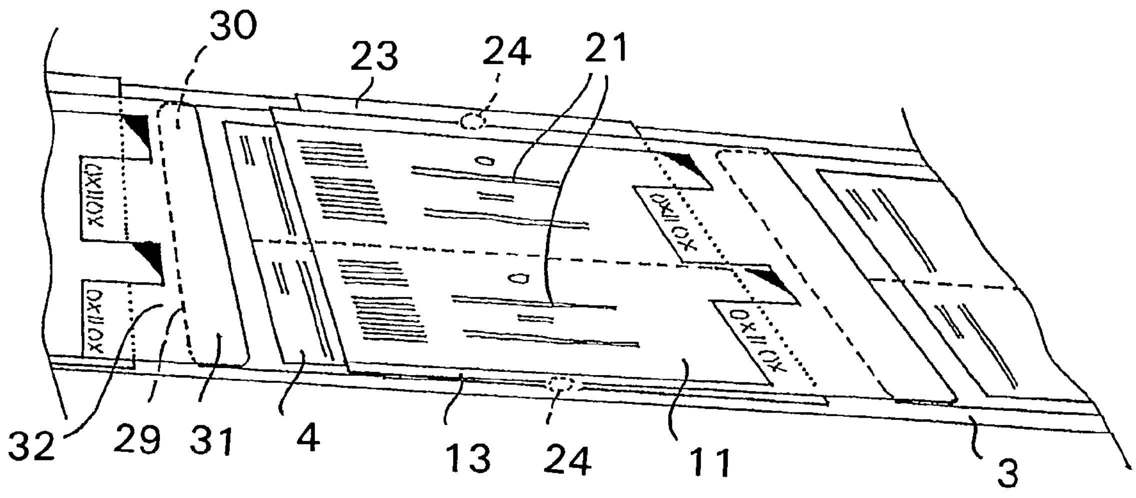
Figure 10:
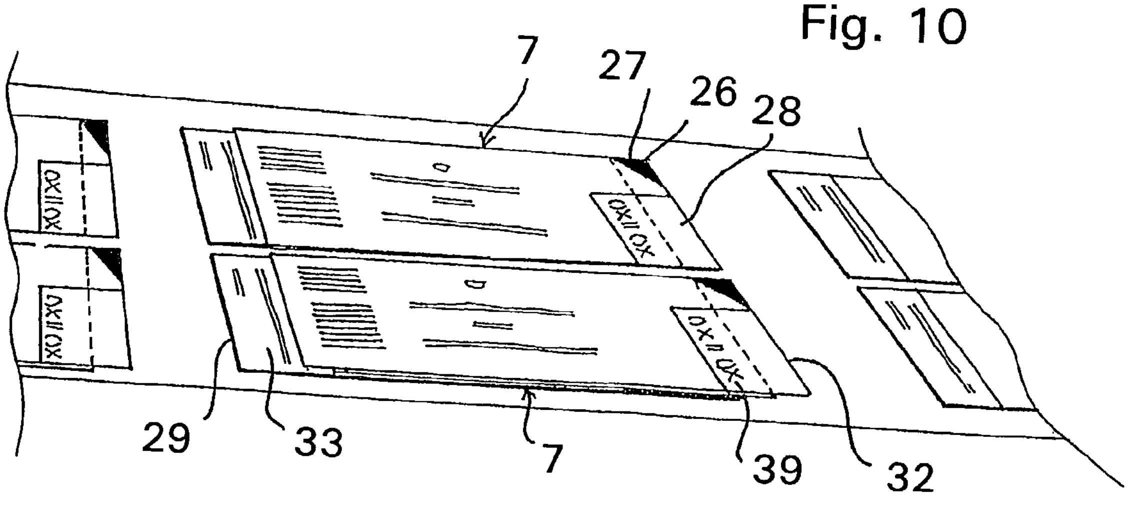

FIG. 6 shows that the starting material, according to FIG. 5, has been used for top labels, in which a section 37, positioned to the left and usually following in the longitudinal direction of the web, has been punched whereas FIG. 7 shows that the starting material, according to FIG. 5, has been used for base labels, in which a usually primary section 38, to the right and in the conveying direction of the web, has been punched, but a portion of windows 28 may remain with a certain function or without it. In this way, top and base labels are obtained having an identical signature, etc., but no such end-positioned portions, which are typical only of the one type of these labels. FIG. 8 shows that two continuous supplements have been positioned on the base label. The supplements are provided with information fields 39, e.g., with coded information, which are to be covered with and visible through windows 28 of the top label, as is shown in FIG. 9, depicting a combination of all the portions before a punching of the material, which will become the residual web. FIG. 10 shows, that fields 30 and 31, which overlap each other as well as a narrow longitudinal strip of the two label types outside the two outermost labels (in a transverse direction), have been punched as well as a narrow strip between labels, adjacent to each other in a transverse direction. Finally, FIGS. 11 and 12, respectively, show a finished laminar label, according to the invention, without and with, respectively, a reference-portion in a phase during the application to a round container and also in an opened-up condition in order to make the supplement available.

The invention is not limited to the embodiments described above and shown in the accompanying drawings, which solely are to be regarded as non-limiting embodiments, which can be modified and supplemented in an arbitrary fashion within the scope of the inventive idea and according to the following claims. Instead of a punching operation and/or another special treatment of the common starting material 40, 41 in order to obtain base labels and top labels with their respective release webs or in addition to this treatment or in principle base labels and top labels can be brought together in a relative displaced condition, the required differences between base labels and top labels being obtained. The punching and/or other special treatments of the top labels and/or the base labels can also be done, completely or partially, between rolls 2 and 8, respectively. Of course, the starting material can be provided with additional special features, which suitably only serve purposes as regards one of these types of labels. Also, supplements 13 may have double or multiple information fields 39, e.g., in addition to a field in the position shown in FIGS. 8–11 on the outer side of the upper side of the supplement also a field on the inner side of the upper side of the supplement or in arbitrary other areas in or on the supplement, which can also be provided with sides, windows, notches, projections, etc., having various lengths and widths.

The invention claimed is:

1. A laminar label (7) comprising a base label (4) attached to a first release web (3) by a first glue layer (5), a supplement (13) being positioned on the base label (4), and the supplement (13) being covered by a top label (11), wherein the top label (11) is located offset with respect to the base label (4) to provide a field (33), which is free of the top label (11), where text may be applied to the base label (4), the base label (4) and the first release web (3) are made of a same starting material (40, 41) as the top label (11) and a second release web (9), and the base label (4) is directly joined to the first release web (3) via the first glue layer (5) and the top label (11) is directly joined to the first release web (3) via a second glue layer (10) in a displaced relationship with respect to each other and with a special treatment of said starting material in order to form the base label and the top label, respectively, and below one of an upper corner area (26) of the top label (11) and the base label (4), a window (28) is provided to show a portion of the supplement (13) and the base label through the top label (11).

2. A laminar label (7) comprising a base label (4) attached to a first release web (3) by a first glue layer (5), a supplement (13) being positioned on the base label (4), and the supplement (13) being covered by a top label (11), wherein the top label (11) is located offset with respect to the base label (4) to provide a field (33), which is free of the top label (11), where text may be applied to the base label (4), the base label (4) and the first release web (3) are made of a same starting material (40, 41) as the top label (11) and a second release web (9), and the base label (4) is directly joined to the first release web (3) via the first glue layer (5) and the top label (11) is directly joined to the first release web (3) via a second glue layer (10) in a displaced relationship with respect to each other and with a special treatment of said starting material in order to form the base label and the top label, respectively, and the first glue layer (5) of the base label (4) and the second glue layer (10) of the top label (11) form a continuous glue free strip (25) in a longitudinal direction of the first and second release webs (3, 9) below an upper edge area of said top and base labels, and an opening notch (27) is positioned in an upper corner area (26) of the top label (11).

3. The laminar label according to claim 1, wherein one end (29) of the base label (4) is overlapped by an extended section (31) at one end of another top label (11), the overlapped end adhere to each other by the second glue layer (10) of the top label and are removed by punching, and a residual portion of the one end of said base label does not adhere to the top label (11) and forms the field (33) to be used for text.

4. A method of producing laminar labels (7) comprising base labels (4) attached to a first release web (3) by a first glue layer (5), a supplement (13) being positioned on each base label, and each supplement (13) being covered by a respective top label (11), wherein the base labels (4) and the first release web (3) are made of a same starting material (40, 41) as the top labels and a second release web (9), the method comprising the steps of:

fastening the base labels (4) to the first release web (3) by the first glue layer (5);

positioning the supplements (13) on top of the base labels and covering the supplements (13) with the top label (11), the starting material (40, 41) is used for two similar functions such as a starting material for the first release web (3) with the base labels (4) and the second release web (9) with the top labels (11), and the base labels (4) are directly joined to the first release web (3) via the first glue layer (5) and the top labels are directly joined to the first release web (3) via a second glue layer (10) in a displaced-relationship with respect to each other and with a special treatment of said starting material in order to obtain the base labels and the top labels, respectively, locating each respective top label (11) offset with respect to the respective base label (4) to provide a field (33), which is free of the respective top label (11), where text may be applied to the respective base label (4), and rear sides of the top and the base labels are covered by the second and the first glue layers (10 and 5, respectively), a glue-free strip (25) in a longitudinal direction of the top and the base labels and the first and second release webs, respectively, is provided on the top and the base labels, suitably in connection with an upper edge of the top and base labels, and having an extension below an opening notch (27) designed to take away the top label from the base label, and one or more windows (28) are provided in at least the top label (11) in order to allow observation of information from the base label and the supplement through the top label.

5. The method according to claim 4, wherein the base labels (4) and the top labels (11) are punched one of partially and completely, before the base labels (4) and the top labels (11) are joined, the base labels and the top labels, which have been joined, are then punched partially, the punching and any other special treatment of the top labels and the base labels is carried out either, partially or completely, and either upstreams or downstreams of starting rolls (2 and 8, respectively) for base labels and top labels respectively, in the latter case, between said starting rolls and the respective application devices (15 and 12, respectively) and label material, removed by punching, is carried away in the form of a residual web (18), which is rolled on another roll (19).

6. The method according to claim 4, wherein the base labels (4) and the top labels (11) and the starting materials are printed during a single printing process in order to guarantee a complete identity regarding signatures (20 and 21, respectively) of the base and top labels, and are controlled and finished on two separate rolls (2 and 8, respectively), which contain the base labels (4) on the first release web (3) and the top labels (11) on the second release web (9), respectively.

7. The method according to claim 4, wherein several of the base labels, the supplements and the top labels are positioned in a transverse direction on the respective first and second release webs, such that portions of outermost specimens of respective components project in a transverse direction past contemplated limit edges in the transverse direction and are removed by punching via a punching device (17) to obtain a continuous rollable residual web, and the supplements (13) are temporarily fastened by glue (24) on punchable portions of the base labels (4) and on the release web (3) of the base labels.

8. The method according to claim 4, wherein one end (29) of the base labels (4) is provided with a first extended section (30) which is overlapped by an adjacent second extended section (31) of end (32) of the top labels (11), the first and second extended sections adjacent each other are removed by punching to obtain a rollable residual web (18) and and a desired spacing (42), in a longitudinal direction, between the laminar labels (7), a remainder of said base label ends (29) are left free from the top labels (11) in order to form the fields (33) on which text may be applied.

9. An apparatus (1) for carrying out a method of producing laminar labels (7) comprising base labels (4) attached to a first release web (3) by a first glue layer (5), supplements (13) being positioned on the base labels, the supplements being covered by a top label (11), the base label (4) and the first release web (3) are made of a same starting material (40, 41) as the top label and a second release web (9), and the method comprising the steps of:

fastening base labels (4) to the release web (3) by the first glue layer (5);

positioning the supplements (13) on top of the base labels and covering the supplements (13) with a top label (11), a starting material (40, 41) is used for two similar functions such as the starting material for the first release web (3) with the base labels (4) and the second release web (9) with the top labels (11), and the base labels (4) are directly joined to the first release web (3) via the first glue layer (5) and a portion of the top labels (11) are directly joined to the first release web (3) via a second glue layer (10) in a displaced relationship with respect to each other and with a special treatment of said starting material in order to obtain the base labels and the top labels, respectively;

the second release web (9), on which the top labels (11) are fastened by a second glue layer (10), a supply (14) of the supplements (13) also being provided a matching separation and application device (15) for separated supplements as well as means (8, 12, 16) to separate the top labels (11) from the matching second release web (9) and transfer the top labels to the release web with the base labels and the supplements, a uniform release web (40) with uniform labels (41) for two different functions are to be used as a second starting material for the first and second release webs (3, 9) and the base and top labels (4, 11), the base labels (4) and the top labels (11) are brought together on the first release web (3) of the base labels in a relatively displaced position with respect to one another and in a form, which has been subjected to punching, in order to function as the base labels and the top labels with guaranteed agreement regarding signatures (20 and 21, respectively) for the produced laminar labels (7);

locating each respective top label (11) offset with respect to the respective base label (4) to provide a field (33), which is free of the respective top label (11), where text may be applied to the respective base label (4), and the apparatus provides a rear side of the base and top labels with the first and second glue layers (10 and 5, respectively), leaving a glue-free strip (25) in a longitudinal direction of the first and the second webs, suitably in connection with an upper edge area of the base and the top labels, said upper edge area in one corner area (26) is provided with an opening notch (27), said corner area is designed to projects in the longitudinal direction mainly above the supplements like a top label section, which is positioned below the corner area and made of a clear film and functions as a window (28) to show a portion of the supplements and the base and the top labels, and ends (29) of the base labels in a conveying direction of the first and the second webs, is provided with an extended section (30) which is overlapped by an extended section (31) of a top label end (32), means are provided to remove the overlapped sections by punching and obtain an automatic required spacing (42) between finished labels in the longitudinal direction of the first and the second webs, a remaining portion of the base label end (29), which thus is not attached to the top label, forms the field (33), on which text can be applied.

10. The apparatus according to claim 9, wherein the apparatus further comprises a first roll (2) having a first release web (3) on which the base labels (4) are applied with the first glue layer (5), active against the first release web, and which leads to another roll (6) with finished laminar labels (7), a second roll (8) with a second release web (9), on which the top labels (11) are positioned, having the second glue layer (10), active against the second web and which, via a separation and application device (12), is brought towards the first release web (3) in such a way that the top labels (11) are released from the second release web and end up on top of the base labels (4), the supplements (13) being included, which are brought towards the base labels (4) from the supply (14) via the separation and application device (15), the second glue layer (10) and the top labels mainly act against the supplements, but also to fasten directly to the base labels in front of and behind the supplements, seen in a direction of the first release web (3) and in a transverse direction of the first release web outside the supplements, and an upper sheet is somewhat longer than underlying sheets, the underlying sheets normally never being able to contact the second glue layer (10) of the top labels (11), and the empty second release web (9) being subsequently be rolled up on a third roll (16).

11. The apparatus according to claim 9, wherein a punching device (17) is positioned between the separation application device (12) for the separation and application of the top labels (11) and a roll (6) with finished labels (7), the punching device punching the base and the top labels to obtain finished laminar labels and form a continuous residue web (18), which will be rolled up on a roll (19) via a guide roll (19').

12. The apparatus according to claim 9, wherein a plurality of the base labels are positioned in a transverse direction on respective webs, portions of outermost specimens of a three components project in a transverse direction past contemplated limit edges in a transverse direction and are removed by punching via said punching device, punchable sections are provided between the laminar labels, positioned adjacent each other, in a transverse direction, and in this way a rollable residual web (18) is obtained, sections (23) of the supplements, which project in the transverse direction past outer contemplated label edges (22), suitably are provided with glue (24) on a side, which faces the base label, to temporarily fasten the supplement to the base label.

13. The laminar label according to claim 1, wherein the supplement (13) is located on a top surface of the base label (4) and completely spaced from the first release web (3) by the base label (4) and the supplement (13)is adhesively secured to a bottom surface of the top label (11) by another glue layer.

14. The method according to claim 4, wherein the supplement (13) is located on a top surface of the base label (4) and completely spaced from the first release web (3) by the base label (4) and the supplement (13) is adhesively secured to a bottom surface of the top label (11) by another glue layer.

15. The apparatus according to claim 9, wherein the supplement (13) is located on a top surface of the base label (4) and completely spaced from the first release web (3) by the base label (4) and the supplement (13) is adhesively secured to a bottom surface of the top label (11) by another glue layer.

16. A laminar label (7) comprising a base label (4) attached to a first release web (3) by a first glue layer (5), a supplement (13) being positioned on the base label (4), and the supplement (13) being covered by a top label (11), wherein the base label (4) and the first release web (3) are made of a same starting material (40, 41) as the top label (11) and a second release web (9), and the base label (4) is directly joined to the first release web (3) via the first glue layer (5) and the top label (11) is directly joined to the first release web (3) via a second glue layer (10) in a displaced relationship with respect to each other and with a special treatment of said starting material in order to form the base label and the top label, respectively;

the first glue layer (5) of the base label (4) and the second glue layer (10) of the top label (11) form a continuous glue free strip (25) in a longitudinal direction of the first and second release webs (3, 9) below an upper edge area of said top and base labels, and an opening notch (27) is positioned in an upper corner area (26) of the top label (11).

* * * * *